United States Patent
Coenegracht

(10) Patent No.: US 12,124,099 B2
(45) Date of Patent: Oct. 22, 2024

(54) LOW COST HARDENED FIBER OPTIC CONNECTION SYSTEM

(71) Applicant: CommScope Connectivity Belgium BVBA, Kessel-Lo (BE)

(72) Inventor: Philippe Coenegracht, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 18/501,429

(22) Filed: Nov. 3, 2023

(65) Prior Publication Data
US 2024/0142738 A1 May 2, 2024

Related U.S. Application Data

(63) Continuation of application No. 17/748,594, filed on May 19, 2022, now Pat. No. 11,822,142, which is a continuation of application No. 17/171,161, filed on Feb. 9, 2021, now Pat. No. 11,372,189, which is a continuation of application No. 16/827,063, filed on
(Continued)

(51) Int. Cl.
*G02B 6/44* (2006.01)
*G02B 6/38* (2006.01)

(52) U.S. Cl.
CPC ......... *G02B 6/4472* (2013.01); *G02B 6/3825* (2013.01); *G02B 6/3877* (2013.01); *G02B 6/3878* (2013.01); *G02B 6/3897* (2013.01); *G02B 6/4442* (2013.01);
(Continued)

(58) Field of Classification Search
None
See application file for complete search history.

(56) References Cited

U.S. PATENT DOCUMENTS

| 4,793,683 A | 12/1988 | Cannon, Jr. et al. |
| 5,212,752 A | 5/1993 | Stephenson et al. |

(Continued)

FOREIGN PATENT DOCUMENTS

| DE | 28 39 411 A1 | 3/1980 |
| EP | 0 244 791 A2 | 11/1987 |

(Continued)

OTHER PUBLICATIONS

International Search Report and Written Opinion of the International Searching Authority for corresponding International Patent Application No. PCT/EP2016/057293 mailed Jun. 27, 2016, 21 pages.
(Continued)

*Primary Examiner* — Jerry Rahll
(74) *Attorney, Agent, or Firm* — Merchant & Gould P.C.

(57) ABSTRACT

The present disclosure relates to a ruggedized/hardened fiber optic connection system designed to reduce cost. In one example, selected features of a fiber optic adapter are integrated with a wall (24) of an enclosure (22). The adapter comprises a sleeve port (26) into which an optical adapter subassembly is inserted. The subassembly comprises a sleeve part (44) which is inserted into the sleeve, a ferrule alignment sleeve (48) which is inserted into the sleeve part, a ferrule (55) with hub which is inserted into the alignment sleeve, and fixing clip (46) securing the ferrule with hub into the alignment sleeve and the sleeve part.

15 Claims, 10 Drawing Sheets

Related U.S. Application Data

Mar. 23, 2020, now Pat. No. 10,955,636, which is a continuation of application No. 16/295,455, filed on Mar. 7, 2019, now Pat. No. 10,775,580, which is a continuation of application No. 15/564,152, filed as application No. PCT/EP2016/057293 on Apr. 3, 2016, now Pat. No. 10,288,820.

(60) Provisional application No. 62/142,836, filed on Apr. 3, 2015.

(52) U.S. Cl.
CPC .......... *G02B 6/3871* (2013.01); *G02B 6/3891* (2013.01); *G02B 6/3894* (2013.01)

(56) References Cited

U.S. PATENT DOCUMENTS

| | | | |
|---|---|---|---|
| 5,271,080 A | 12/1993 | Hopper | |
| 5,317,663 A | 5/1994 | Beard et al. | |
| 5,548,674 A | 8/1996 | Rondeau | |
| 5,670,747 A | 9/1997 | Lawer | |
| 5,719,977 A | 2/1998 | Lampert et al. | |
| 5,778,122 A * | 7/1998 | Giebel | G02B 6/3885 385/139 |
| 5,892,870 A | 4/1999 | Fingler et al. | |
| 6,206,714 B1 | 3/2001 | Bernardini | |
| 6,454,464 B1 | 9/2002 | Nolan | |
| 6,579,014 B2 | 6/2003 | Melton et al. | |
| 6,962,445 B2 | 11/2005 | Zimmel | |
| 7,146,090 B2 | 12/2006 | Vo et al. | |
| 7,264,402 B2 | 9/2007 | Theuerkorn et al. | |
| 7,467,896 B2 | 12/2008 | Melton et al. | |
| 7,686,519 B2 | 3/2010 | Lu | |
| 7,744,288 B2 | 6/2010 | Lu et al. | |
| 7,758,389 B2 | 7/2010 | Kadar-Kallen | |
| 8,532,490 B2 | 9/2013 | Smith et al. | |
| 8,556,520 B2 | 10/2013 | Elenbaas et al. | |
| 8,628,252 B2 | 1/2014 | Matsumoto | |
| 10,353,162 B1 | 7/2019 | Zhou et al. | |
| 2002/0131721 A1 | 9/2002 | Gaio et al. | |
| 2003/0010519 A1 | 1/2003 | Pieck | |

FOREIGN PATENT DOCUMENTS

| | | |
|---|---|---|
| EP | 0 819 960 A2 | 1/1998 |
| EP | 1 775 612 A2 | 4/2007 |
| EP | 2 355 286 B1 | 8/2011 |
| EP | 2 423 722 A1 | 2/2012 |
| JP | 2005-010477 A | 1/2005 |
| JP | 2005-084138 A | 3/2005 |
| JP | 2011-517274 A | 5/2011 |
| KR | 10-0850925 B1 | 8/2008 |
| WO | 02/052310 A2 | 7/2002 |
| WO | 2005/081028 A1 | 9/2005 |
| WO | 2008/091937 A2 | 7/2008 |
| WO | 2008/128940 A1 | 10/2008 |
| WO | 2014/049469 A1 | 4/2014 |
| WO | 2015/144883 A1 | 1/2015 |

OTHER PUBLICATIONS

Extended European Search Report for corresponding European Patent Application No. 20167437.1 mailed Aug. 3, 2020, 9 pages.

* cited by examiner

LOW COST HARDENED FIBER OPTIC CONNECTION SYSTEM

CROSS-REFERENCE TO RELATED APPLICATION

This application is a continuation of U.S. patent application Ser. No. 17/748,594, filed May 19, 2022, now U.S. Pat. No. 11,822,142, which is a continuation of U.S. patent application Ser. No. 17/171,161, filed on Feb. 9, 2021, now U.S. Pat. No. 11,372,189, which is a continuation of U.S. patent application Ser. No. 16/827,063, filed on Mar. 23, 2020, now U.S. Pat. No. 10,955,636, which is a continuation of U.S. patent application Ser. No. 16/295,455, filed on Mar. 7, 2019, now U.S. Pat. No. 10,775,580, which is a continuation of U.S. patent application Ser. No. 15/564,152, filed on Oct. 3, 2017, now U.S. Pat. No. 10,288,820, which is a National Stage Application of PCT/EP2016/057293, filed on Apr. 3, 2016, which claims the benefit of U.S. Patent Application Ser. No. 62/142,836, filed on Apr. 3, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors and fiber optic connection systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected together without requiring a splice, and also allow such optical fibers to be easily disconnected from one another. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut or are in close proximity to one another and the ferrules are forced proximally relative to their respective connector housings against the bias of their respective springs. Ideally, the optical fibers of two connected fiber optic connectors are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter (see U.S. Pat. No. 5,317,663, which is hereby incorporated herein by reference) having a sleeve that receives and aligns the respective ferrules supporting the optical fibers desired to be optically coupled together.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520. Improvements are needed in the areas of assembly and cost.

SUMMARY

One aspect of the present disclosure relates to a telecommunications device including an enclosure having an enclosure wall and a sleeve unitarily integrated with the enclosure wall. The sleeve defines a connector port that extends through the enclosure wall. The sleeve includes a connector fastening structure adjacent an outer end of the sleeve. The connector fastening structure is configured to mate with a corresponding fastening structure of an exterior hardened connector to secure the exterior hardened connector within the connector port. A subassembly mounts within the enclosure at an inner end of the sleeve. The subassembly includes a housing including a front housing piece that fastens to the inner end of the sleeve. The subassembly also includes a ferrule alignment sleeve that mounts within the front housing piece. The subassembly further includes a ferrule assembly including a ferrule and a ferrule hub mounted at a rear end of the ferrule. The ferrule has a front end portion that fits within the ferrule alignment sleeve. The ferrule supports an optical fiber that extends through the ferrule in a rear-to-front orientation. The subassembly further includes a rear housing piece that attaches to a rear end of the front housing and captures the ferrule assembly within the front housing piece.

Another aspect of the present disclosure relates to a telecommunications device including a connector port defining structure having an outer end and an inner end. The connector port defining structure defines a connector port configured for receiving a hardened fiber optic connector at the outer end of the connector port defining structure. The connector port defining structure includes a connector fastening structure adjacent to the outer end. The connector fastening structure is configured to mate with a corresponding fastening structure of the hardened fiber optic connector when the hardened fiber optic connector is secured within the connector port. The telecommunications device also includes a subassembly that mounts at the inner end of the connector port defining structure. The subassembly includes a housing having a front housing piece that fastens to the inner end of the connector port defining structure. The subassembly also includes a ferrule alignment sleeve that mounts within the front housing piece. The subassembly further includes a ferrule assembly including a single-fiber ferrule and a ferrule hub mounted at a rear end of the ferrule. The ferrule has a front end portion that fits within the ferrule alignment sleeve. The subassembly further includes a rear housing piece that attaches to a rear end of the front housing and captures the ferrule subassembly within the front housing piece. The front housing piece defines an internal transverse cross-sectional shape that mates with an outer transverse cross-sectional shape of the ferrule hub to prevent relative rotation between the ferrule assembly and the front housing piece when the internal and outer transverse cross-sectional shapes are mated.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Aspects of the present disclosure relate to ruggedized/hardened fiber optic connection systems designed to reduce cost. In certain examples, selected fiber optic adapter features are integrated into and made unitary with a wall of an enclosure so as to reduce the number of parts and thereby reduce costs. In certain examples, ruggedized connector coupling structures such as internal threads, external threads, bayonet slots, bayonet posts or other structures can be provided on a port sleeve integrated with a wall of an enclosure.

Another aspect of the present disclosure relates to a subassembly that integrates features of a fiber optic connector and features of a fiber optic adapter into one subassembly. From one perspective, the subassembly can be considered as a fiber optic connector having fiber optic adapter functionality integrated therein. From another perspective, the subassembly can be viewed as a fiber optic adapter having fiber optic connector functionality integrated therein. The subassembly is configured to require a reduced number of parts as compared to systems having a separate fiber optic adapter that interconnects two separate fiber optic connectors that are each intended to be easily be inserted into and removed from the fiber optic adapter (e.g., SC connectors, LC connectors, DLX™ connectors sold by TE Connectivity, OptiTap™ connectors sold by Corning Cable Systems, etc.) By integrating features of a fiber optic connector and a fiber optic adapter into one subassembly, the total number of parts can be reduced thereby facilitating assembly operations and reducing cost.

Figure 1:
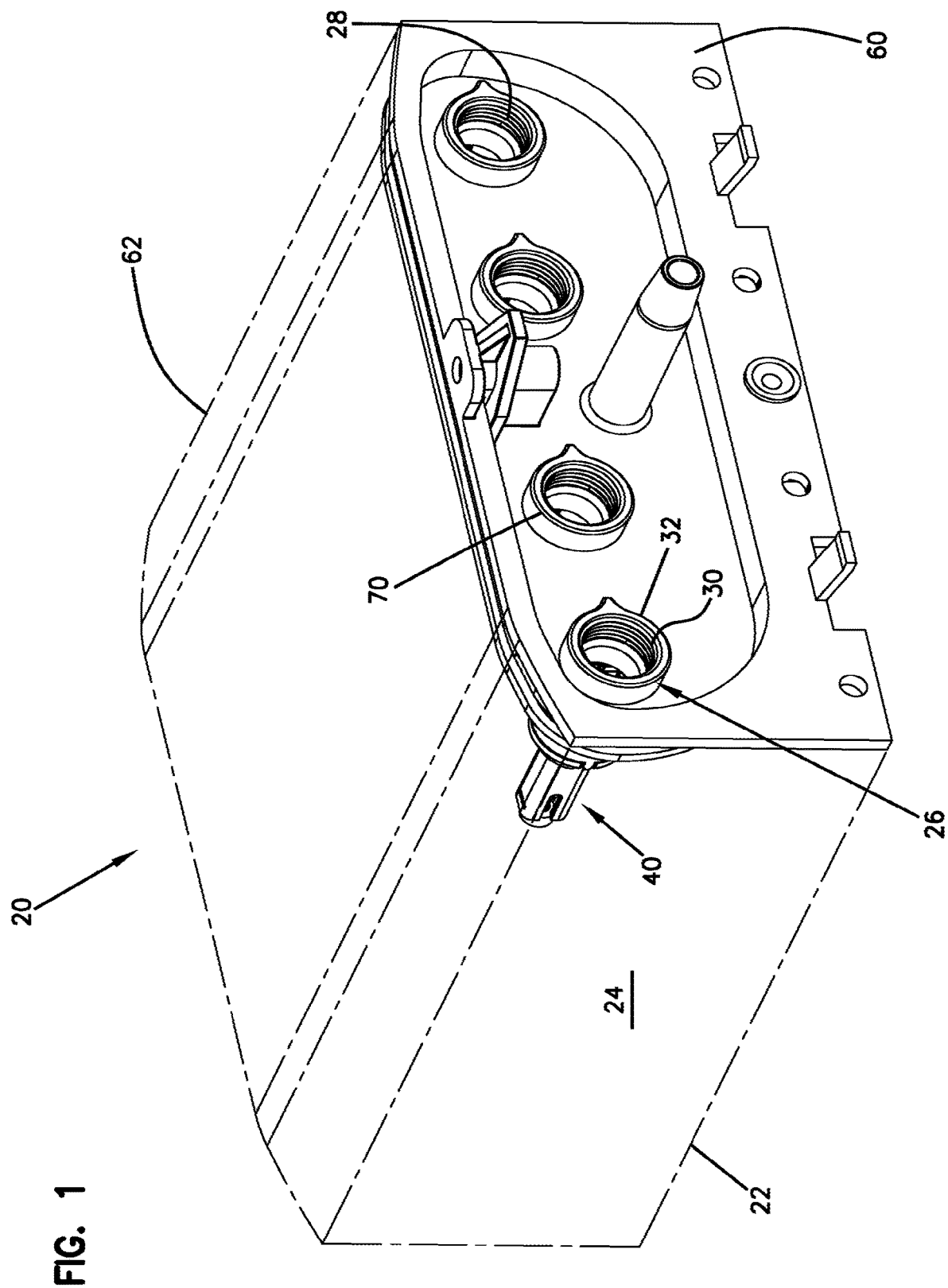
FIG. 1 depicts an enclosure in accordance with the principles of the present disclosure.
Figure 2:
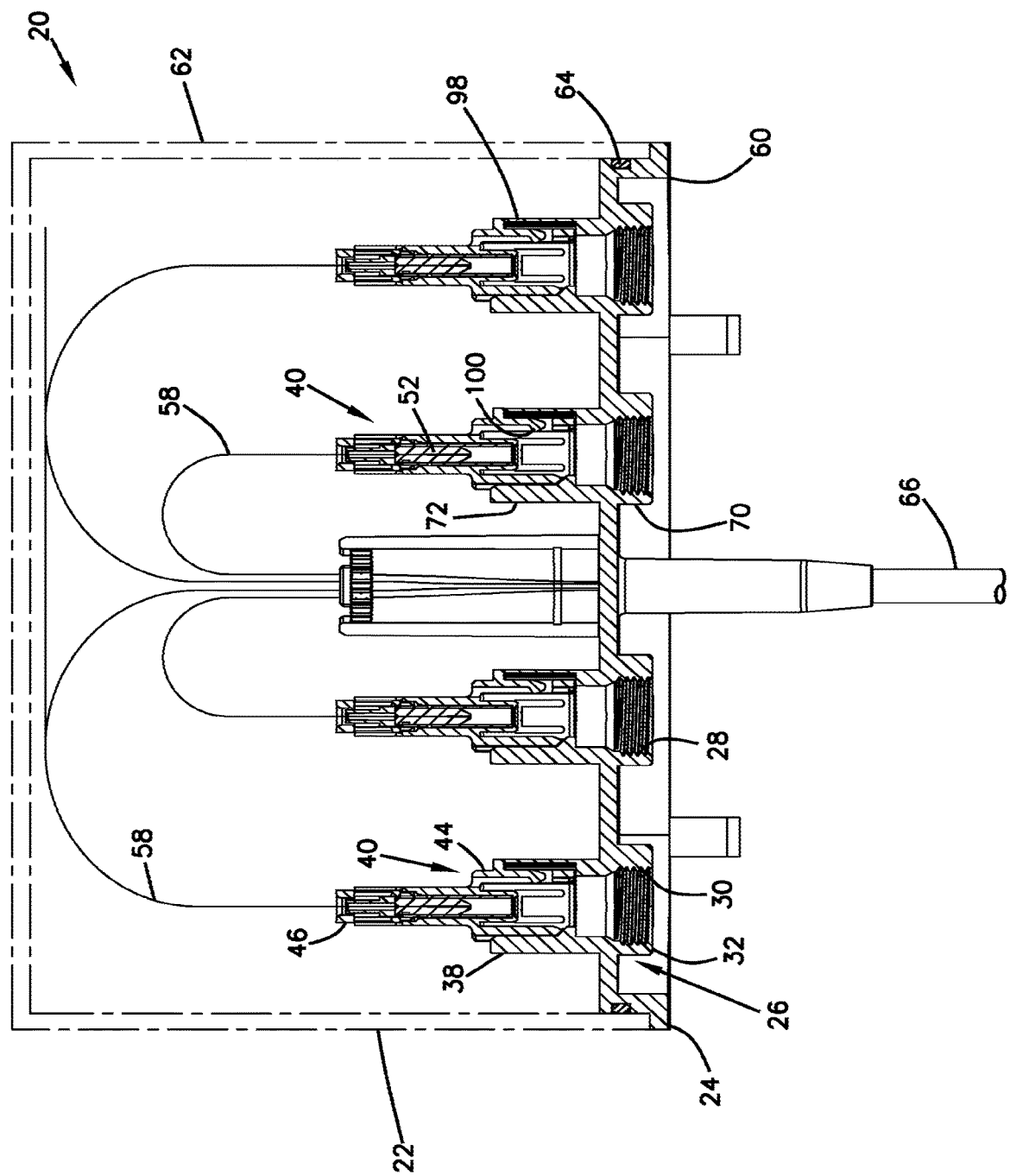
FIG. 2 is a cross-sectional view through the enclosure of FIG. 1.
Figure 3:
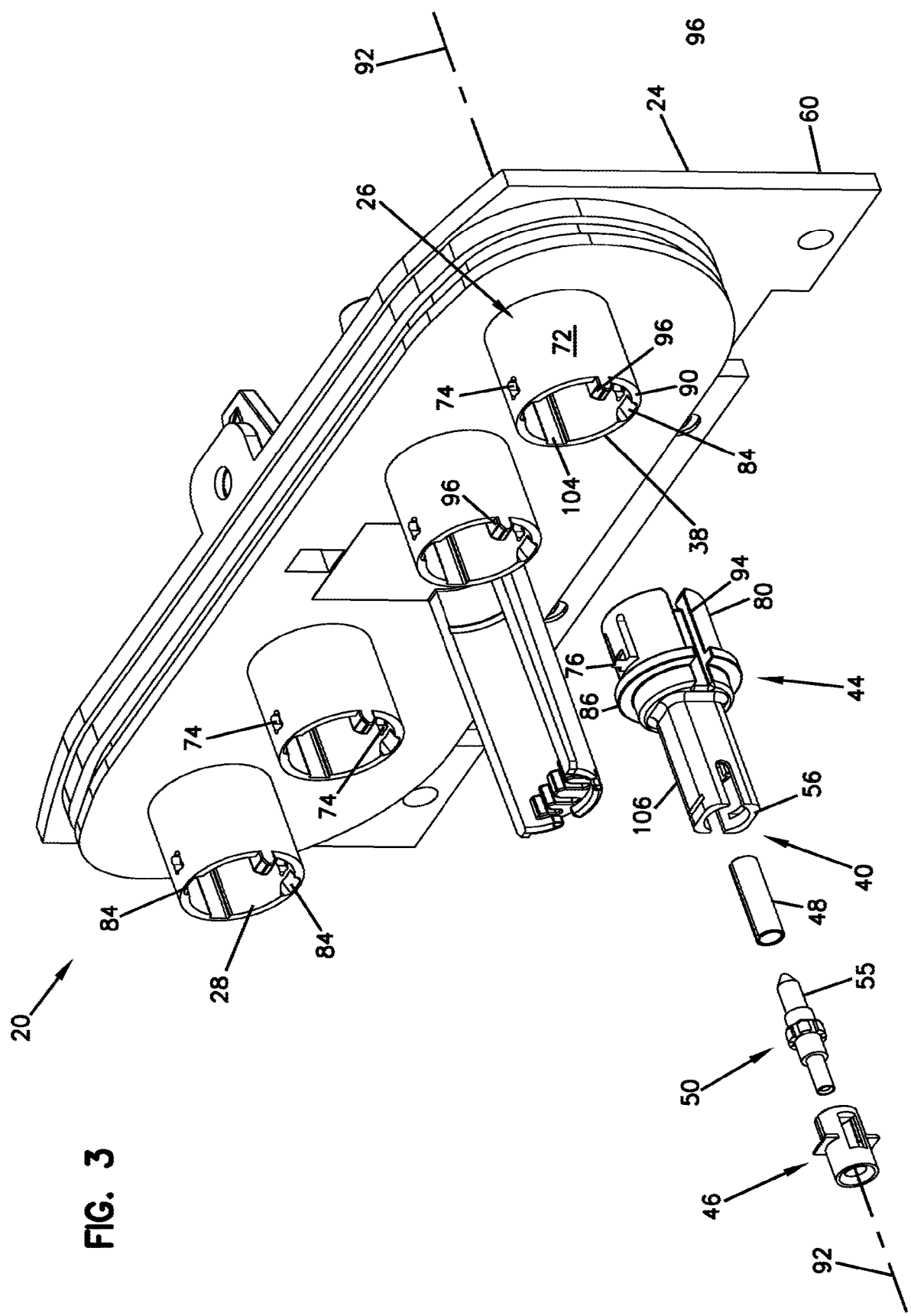
FIG. 3 depicts an interior side of an end plate of the enclosure of FIG. 1.
Figure 6:
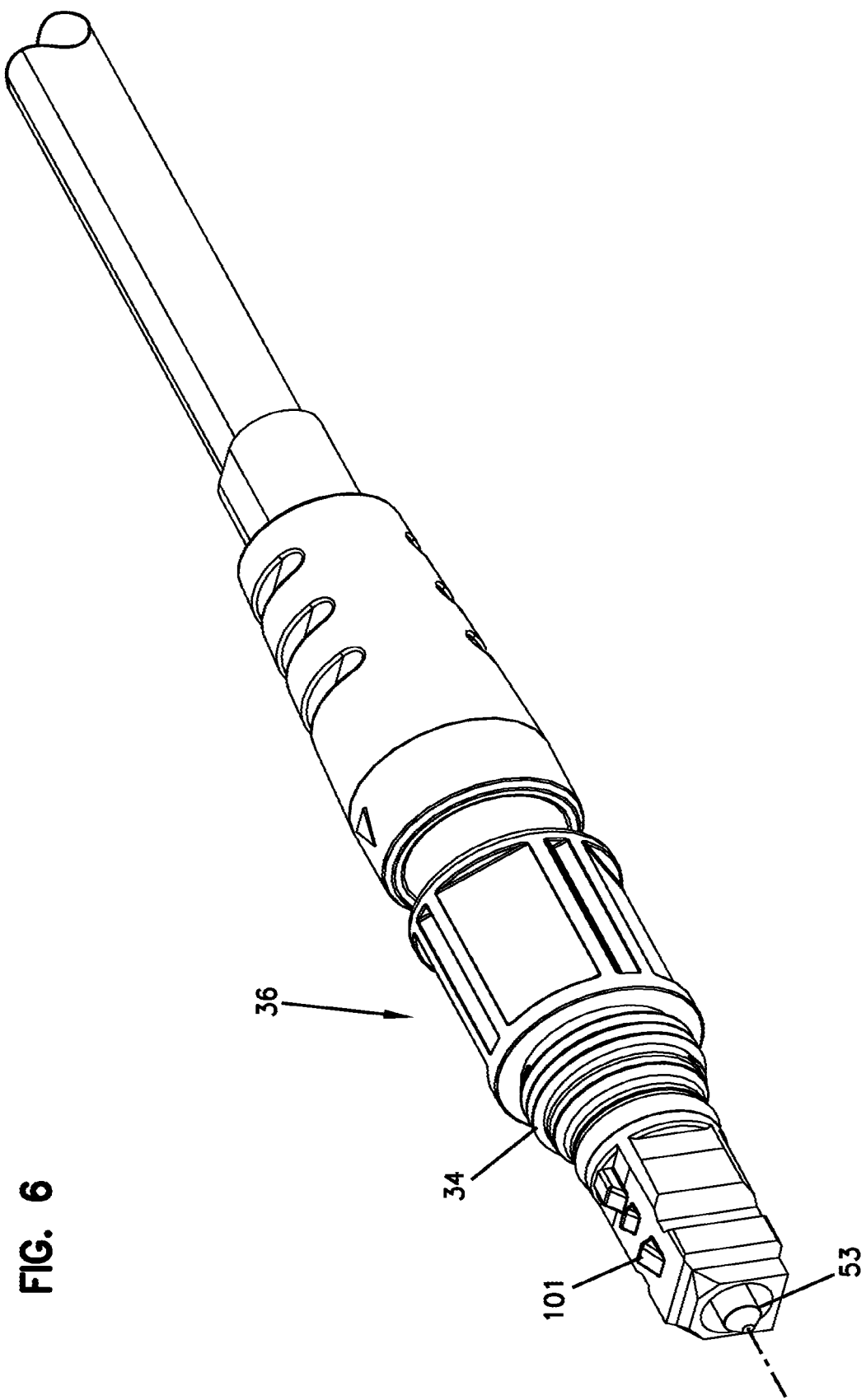
FIG. 6 depicts a hardened connector configured to mate with the outer end of the sleeve integrated into the end plate of FIGS. 1 and 2.

FIGS. 1-3 illustrate a telecommunications device 20 in accordance with the principles of the present disclosure. The telecommunications device 20 includes an enclosure 22 that in certain examples is environmentally sealed. The enclosure 22 includes an enclosure wall 24 and at least one sleeve 26 unitarily integrated with the enclosure wall 24. In the depicted example, a plurality of the sleeves 26 are unitarily integrated with the enclosure wall 24. The sleeves 26 define connector ports 28 that extend through the enclosure wall 24 from an exterior of the enclosure 22 to an interior of the enclosure 22. The sleeves 26 include connector fastening structures 30 positioned adjacent to outer ends 32 of the sleeves 26. The connector fastening structures 30 are configured to mate with corresponding fastening structures 34 of exterior hardened connectors 36 (see FIG. 6) to secure the hardened connectors 36 within the connector ports 28. The sleeves 26 also include inner ends 38 positioned inside the enclosure 22.

Figure 4:
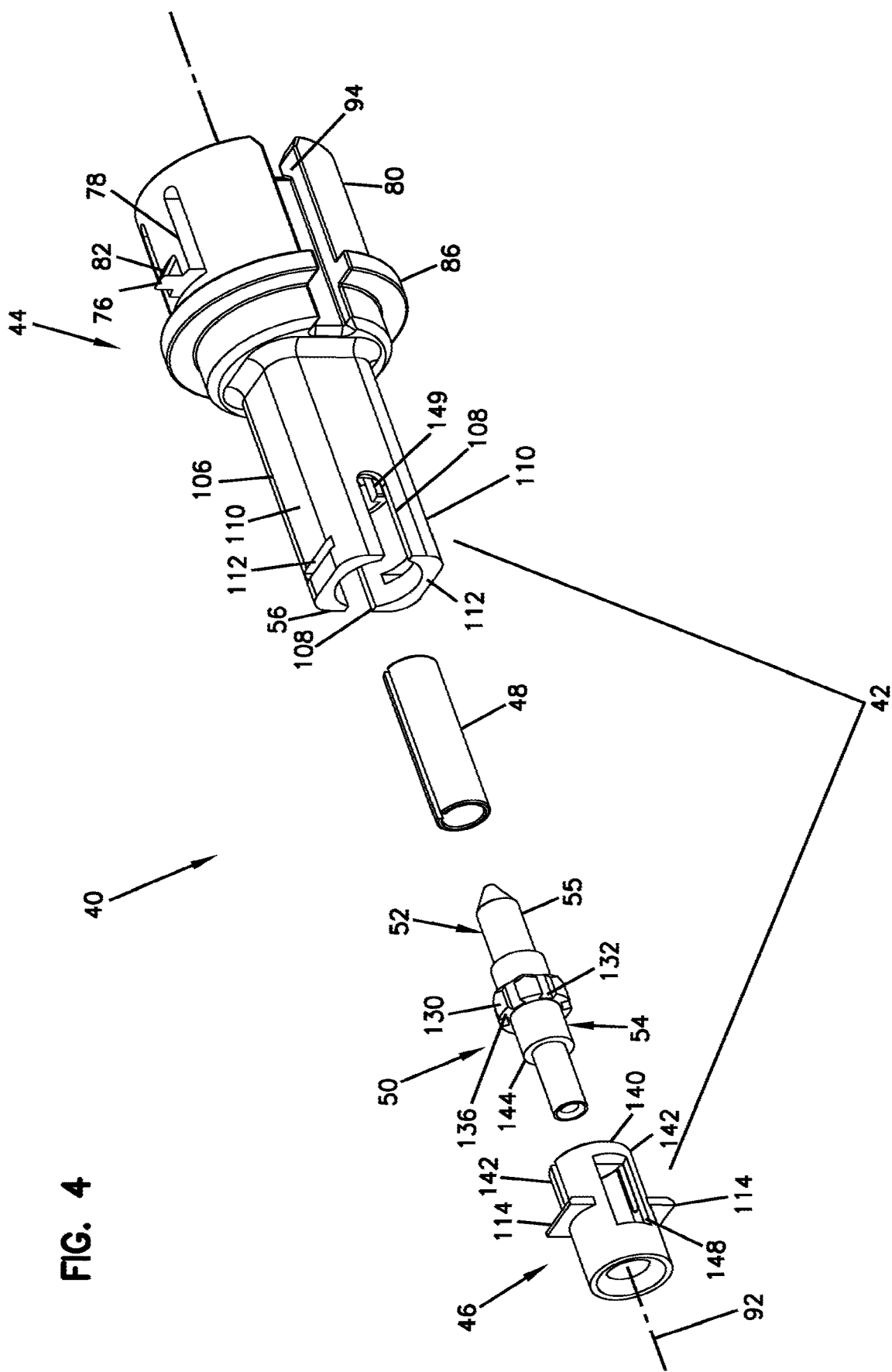
FIG. 4 is an exploded view of a subassembly that mounts within an inner end of a sleeve integrated with the end plate of the enclosure of FIG. 1.
Figure 5:
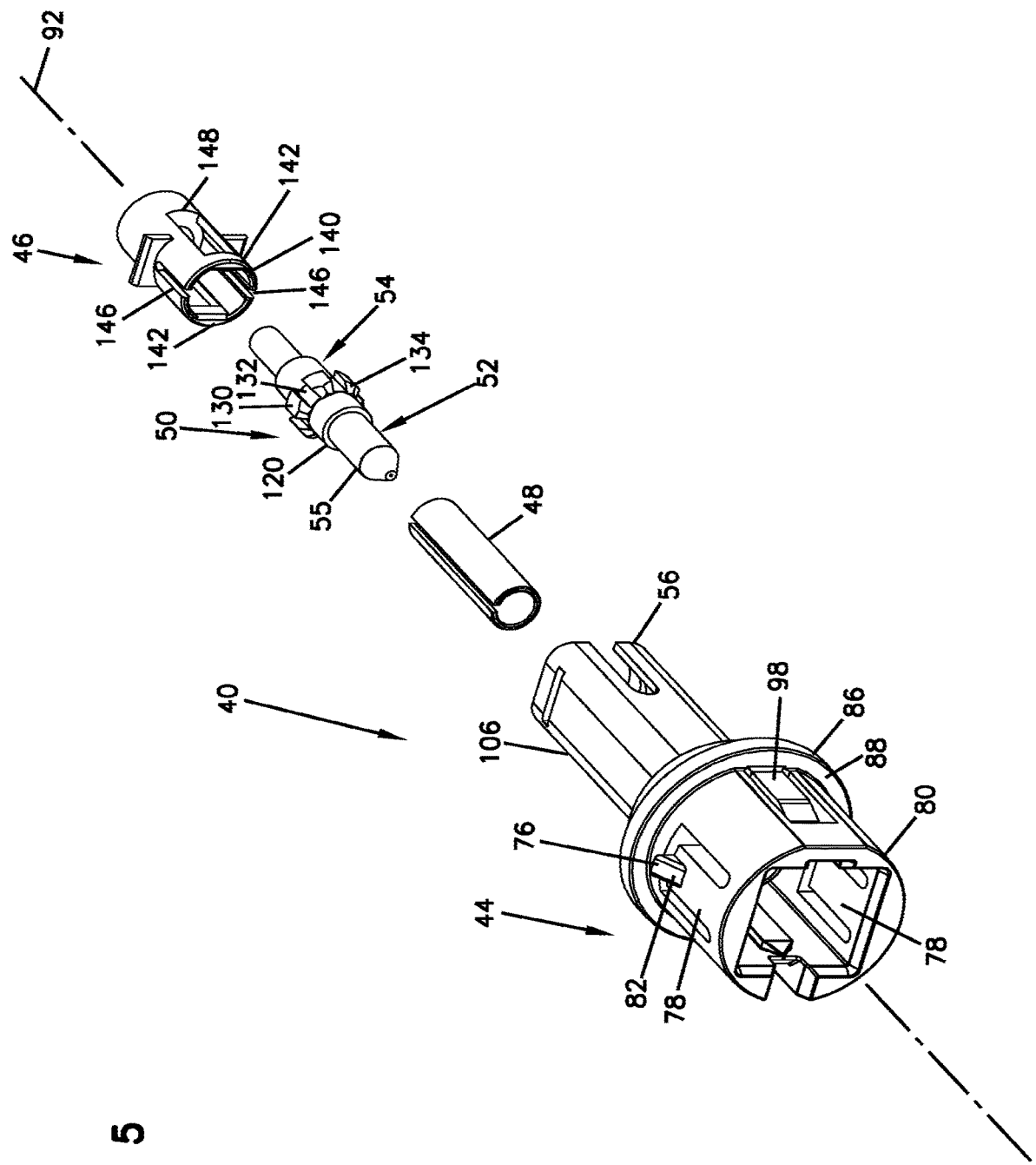
FIG. 5 is another exploded view of the subassembly of FIG. 4.

Referring still to FIGS. 1-3, the telecommunications device 20 also includes subassemblies 40 that mount within the enclosure 22 at the inner ends 38 of the sleeves 26. As best shown at FIGS. 3-5, the subassemblies 40 each include a housing 42 including a front housing piece 44 and a rear housing piece 46. The subassembly 40 also includes a ferrule alignment sleeve 48 and a ferrule assembly 50 that mount within the front housing piece 42. The ferrule assembly 50 includes a ferrule 52 and a ferrule hub 54 mounted at a rear end of the ferrule 52. In certain examples, the ferrule 52 is a single-fiber ferrule having a generally cylindrical front end portion 55 configured to fit within the ferrule alignment sleeve 48. The subassembly 40 is assembled by loading the ferrule alignment sleeve 48 and the ferrule assembly 50 into the front piece 44 through a rear end 56 of the front piece, and then fastening the rear housing piece 46 to the rear end 56 of the front housing piece 44 thereby capturing the ferrule assembly 50 and the ferrule alignment sleeve 48 within the interior of the front housing piece 44. The ferrule 52 can support an optical fiber 58 (see FIG. 2) that extends through the ferrule 52 in a rear-to-front orientation.

In certain examples, the enclosure 22 can include an environmentally sealed outer housing configured for allowing the enclosure to be used for outdoor applications. In certain examples, the enclosure 22 can function as a drop terminal (i.e., a multi service terminal) that includes drop ports for providing optical connections to subscriber locations through the use of drop cables. It will be appreciated that the drop cables can be terminated with connectors (e.g., such as the exterior hardened connector 36) which are adapted to be received within the connector ports 28. As shown at FIG. 1, the housing of the enclosure 22 can include an end wall 60 and a removable cover structure such as a dome 62. An environmental seal 64 (e.g., a gasket such as an O-ring or other type of sealing structure as shown at FIG. 2) can be provided between the end wall 60 and the dome 62. As shown at FIG. 2, an input cable 66 can be routed into the interior of the enclosure 22. Within the enclosure 22, optical fibers 58 of the input cable 66 can be broken out and routed to the subassemblies 40. In certain examples, end portions of the optical fibers 58 are supported within the ferrules 52 of the subassemblies 40. By inserting the connectorized end of a drop cable into one of the connector ports 28, an optical fiber of the drop cable is optically connected to a corresponding one of the optical fibers 58. In this way, the telecommunications device 20 can be used to assist in extending and expanding fiber optic networks by providing readily accessible connectors ports in the field for optically connecting fiber optic distribution cables such as the input cables 66 to subscriber locations through the use of drop cables.

As described above, the sleeves 26 are unitarily integrated with the enclosure wall 24. The enclosure wall 24 can be any wall of the enclosure whether it is the end wall 60 or the wall forming the dome 62. By open "unitarily integrated", it is meant that the sleeves 26 are connected to the enclosure wall 24 at a seamless connection. In one example, the enclosure wall 24 and the sleeves 26 are part of a one-piece molded structure made of a material such as plastic.

Referring to FIG. 2, each of the sleeves 26 includes an outer sleeve portion 70 and an interior sleeve portion 72. The outer sleeve portion 70 is unitarily formed with the enclosure wall 24 and projects outwardly from the enclosure wall 24. The interior sleeve portion 72 is unitarily formed with the enclosure wall 24 and projects inwardly from the enclosure wall. The outer sleeve portion 70 includes the connector fastening structure 30 configured to interface with the fastening structure 34 of the hardened connector 36. In the depicted example, the connector fastening structure 30 includes internal threads defined within the outer sleeve portion 70, and the fastening structure 34 of the hardened connector 36 includes outer threads provided on a nut of the hardened fastener 36. In other examples, the connector fastening structure can include outer threads defined about the exterior of the outer sleeve portion 70 that are configured to mate with corresponding inner threads defined by a connection sleeve of a hardened connector. In still other examples, the connector fastening structure can include bayonet-type fastening structures such as bayonet grooves or bayonet slots defined either on the inside or the outside of the outer sleeve portion 70.

A fastening interface is provided for fastening the front housing piece 44 to the interior sleeve portion 72 of the sleeve 26. In one example, the fastening interface includes structure for providing a snap-fit connection. For example, as shown at FIG. 3, the interior sleeve portion 72 includes retention openings 74 adapted for receiving retention tabs 76 of the front housing piece 44. The retention openings 74 are positioned on opposite sides (e.g., top and bottom sides) of the interior sleeve portion 72. Thus, the retention openings 74 are positioned about 180° apart from one another about a central axis of the sleeve 26.

The retention tabs 76 are provided on flexible cantilevers 78 provided at a front portion 80 of the front housing piece 44. The front portion 80 of the front housing piece 44 has an outer shape that is generally cylindrical. The flexible cantilevers 78 have base ends that are unitarily formed with a cylindrical body of the front portion 80. The front portion 80 is configured to fit within a generally cylindrical receptacle defined by the interior sleeve portion 72. When the front portion 80 is fully inserted within the interior sleeve portion 72, the retention tabs 76 snap within the retention openings 74. The retention tabs 76 can have ramp surfaces 82 that engage ramped guide notches 84 defined by the interior sleeve portion 72. The ramped guide notches 84 assist in guiding the retention tabs 76 to the retention openings 74. Interaction between the ramped surfaces causes the flexible cantilevers 78 to flex inwardly as the front portion 80 of the front housing piece 44 is inserted into the interior sleeve portion 72. When the retention tabs 76 reach the retention openings 74, the flexible cantilevers 78 elastically snap outwardly to a retaining position in which the retention tabs 76 are positioned within the retention openings 74.

The front housing piece 44 also includes an annular flange 86 having a shoulder 88 that opposes an inner end 90 of the interior sleeve portion 72. Contact between the shoulder 88 and the inner end 90 prevent the front portion 80 from being inserted too far within the interior sleeve portion 72. In this way, the shoulder 88 and the inner end 90 function to provide a positive stop that limits the depth of insertion of the front portion 80 into the interior sleeve portion 72.

In certain examples, the telecommunications device 20 can include a keying interface for ensuring that the front housing piece 44 is inserted into the interior sleeve portion 72 at a predefined rotational orientation. In certain examples, the rotational orientation is taken relative to a central longitudinal axis 92 of the subassembly 40. In certain examples, the central longitudinal axis 92 is coaxially aligned with a central longitudinal axis of the ferrule 52 and a central longitudinal axis of the sleeve 26. Thus, the central longitudinal axis 92 is representative of such axes as well.

As shown at FIG. 3, an example keying arrangement includes mating parts defined by the front portion 80 of the front housing piece 44 and the interior sleeve portion 72 of the sleeve 26. In the depicted example, the front portion 80 defines an axial channel 94 that receives a corresponding axial rail 96 provided within the interior sleeve portion 72. It will be appreciated that in other examples the axial rail 96 and the axial channel 94 can be reversed such that the rail is provided on the front portion 80 and the channel is provided by the interior sleeve portion 72. Furthermore, it will be appreciated that other mating interlock configurations (e.g., flats, other projection types, etc.) can also be used to provide rotational keying between the front housing piece 44 and the sleeve 26.

Referring to FIGS. 2 and 5, the front portion 80 of the front housing piece 44 also includes a flexible latching arm 98 positioned at an opposite side of the front portion 80 from the axial channel 94. The flexible latching arm 98 extends in an axial direction and includes a latching tab 100 that extends radially toward the central longitudinal axis 92. When the hardened connector 36 is inserted within the connector port 28, the latching tab 100 flexes radially outwardly and then snaps to a latching position in which the latching tab 100 opposes a retaining projection 101 that projects outwardly from a connector body of the hardened connector 36. The interior sleeve portion 72 defines an axial channel 104 positioned opposite from the axial rail 96. The axial channel 104 provides clearance space for allowing the flexible latching arm 98 to flex radially outwardly as the hardened connector 36 is initially inserted into the connector port 28 and the retaining projection 101 moves past the latching tab 100.

Referring to FIG. 4, the front portion 80 of the front housing piece 44 is generally cylindrical and is enlarged in a transverse orientation when compared to a rear portion 106 of the front housing piece 44. The rear portion 106 is generally rectangular in shape. Adjacent the rear end 56 of the front housing piece 44, the rear portion 106 of the front housing piece 44 defines oppositely positioned axial slots 108 that divide the rear portion 106 into oppositely positioned elastic arms 110. The elastic arms 110 define retention slots 112 configured for receiving retention tabs 114 of the rear housing piece 46. The retention slots 112 and the retention tabs 114 cooperate to provide a snap-fit connection between the rear housing piece 46 and the rear portion 106 of the front housing piece 44. The rear housing piece 46 is secured to the front housing piece 44 by pushing the rear housing piece forwardly into the rear portion 106 of the front housing piece. As the rear housing piece 46 is moved forwardly relative to the front housing piece 44, the retention tabs 144 engage the elastic arms 110 forcing the elastic arms elastically apart from one another. Forward movement of the rear housing piece 46 continues until the retention tabs 114 reach the retention slots 112. When the retention tabs 114 reach the retention slots 112, the elastic arms 110 snap radially inwardly such that the retention tabs 114 move into the retention slots 112. Front surfaces of the retention tabs 114 can be ramped while rear surfaces are not ramped. This configuration facilitates insertion of the rear housing piece 46 into the front housing piece 44 and resists removal of the rear housing piece 46 from the front housing piece 44. It will be appreciated that the tabs and slots can be reversed and other snap-fit configurations can be used as well.

It will be appreciated that the snap-fit connection between the rear housing piece 46 and the front housing piece 44 is a secure snap-fit connection that is not typically disconnected during normal use. No structure such as release sleeves or other similar structures are provided for facilitating disengaging the rear housing piece 46 from the front piece 44. While it is possible to pry the elastic arms 110 apart to remove the rear housing piece 46 from the front housing piece 44, this typically would not be done under normal conditions. Instead, snap-fit connection between the rear housing piece 46 and the front housing piece 44 is intended to be semi-permanent.

Referring to FIG. 4, the ferrule alignment sleeve 48 is depicted as a cylindrical split-sleeve. It will be appreciated that the ferrule alignment sleeve 48 has an elastic construction that allows the ferrule alignment structure 48 to flex open to receive the front end portion 55 of the ferrule 52 as well as the ferrule corresponding to the hardened connector 36. The ferrule alignment sleeve 48 functions to coaxially align the ferrule 52 with a ferrule 53 of the hardened connector 36 along the central longitudinal axis 92. In this way, an optical coupling can be provided between the optical fibers held by the ferrules. In certain examples, the ferrule alignment sleeve 48 can be manufactured of a material such as Zirconia Ceramic, Phosphor Bronze, plastic materials, and other materials having suitable elastic characteristics.

Figure 2A:
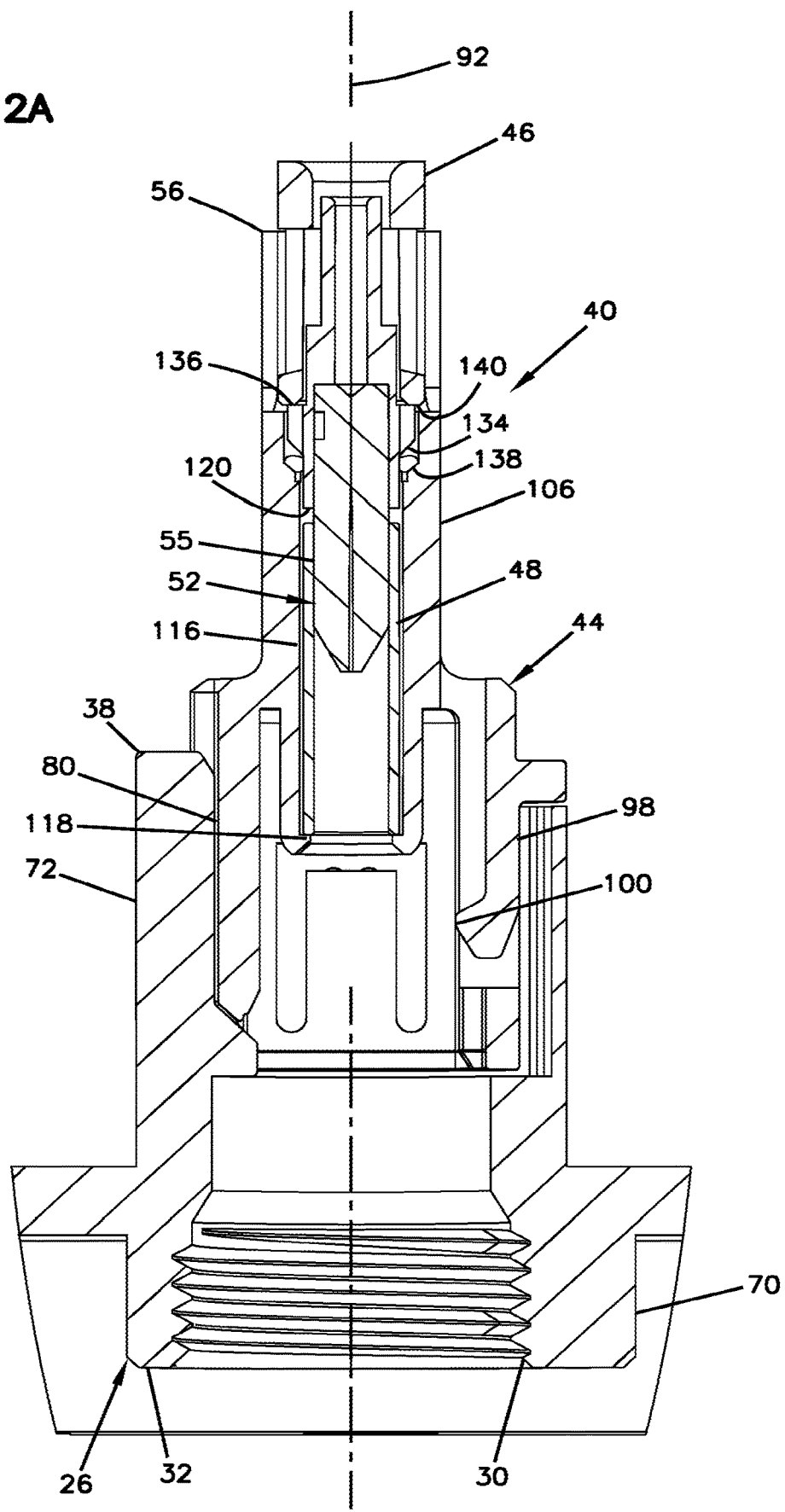
FIG. 2A is an enlarged, detailed view of a portion of FIG. 2.

It will be appreciated that the front housing piece 44 is configured to receive and hold the ferrule alignment sleeve 48 in a position along the central longitudinal axis 92. For example, as best shown at FIG. 2A, the front housing piece 44 can define a cylindrical sleeve receptacle 116 for receiving the ferrule alignment sleeve 48. The front housing piece 44 can also include a front stop 118 that engages a front end of the ferrule alignment sleeve 48 to stop forward movement of the ferrule alignment sleeve 48 within the cylindrical sleeve receptacle 116. The ferrule alignment sleeve 116 is loaded into the sleeve receptacle 116 through the rear end 56 of the front housing piece 44 and is captured between the front stop 118 and the ferrule assembly 50. The front housing piece 44 does not include a rear stop or any other type of positive stopping arrangement configured for engaging a rear end of the ferrule alignment sleeve 48. Instead, the ferrule assembly 50 functions to stop rearward movement of the ferrule alignment sleeve 48 within the sleeve receptacle 116. For example, a forwardly facing stop shoulder 120 provided on the ferrule hub 54 opposes and engages a rear end of the ferrule alignment sleeve 48 to provide a positive stop against rearward movement of the ferrule alignment sleeve 48 within the sleeve receptacle 116.

Referring to FIG. 5, the ferrule hub 54 includes a circumferential outer hub flange 130 defining a plurality of peripheral notches 132 spaced circumferentially about the central longitudinal axis 92. The outer hub flange 130 includes a front side 134 and a rear side 136. When the ferrule assembly 50 is loaded within the front housing piece 44, the front side 134 of the outer flange 130 opposes a corresponding stop feature 138 provided within the interior of the front housing piece 44. Engagement between the front side 134 of the outer flange 130 and the stop feature 138 limits forward movement of the ferrule assembly 50. When the rear housing piece 46 is snapped within the front housing piece 44, a front end 140 of the rear housing piece 46 functions as a rear stop that opposes the rear side 136 of the outer flange 130. Contact between the rear side 136 of the outer flange 130 and the front end 140 of the rear housing piece 46 limits rearward movement of the ferrule assembly 50. In this way, the ferrule assembly 50 is effectively captured between the front housing piece 44 and the rear housing piece 46 such that the pieces 44, 46 cooperate to retain the ferrule assembly 50 in a generally fixed axial position along the central longitudinal axis 92. In the depicted embodiment, no spring is provided for biasing the ferrule assembly 50 in a forward direction or for allowing biased movement of the ferrule assembly 50 along the central longitudinal axis 92. However, it will be appreciated that in other embodiments, a spring may be provided between the ferrule hub 54 and the rear housing piece 46 so as to bias the ferrule assembly 50 in a forward direction.

Referring still to FIG. 5, the rear housing piece 46 can include structure for clamping upon the ferrule hub 54 to more securely retain the ferrule assembly 50 in a relatively fixed axial position. For example, the rear housing piece 46 can include resilient clamping arms 142 that clamp upon a rear portion 144 of the ferrule hub 54 when the subassembly 40 is assembled. The clamping arms 142 are positioned on opposite sides of axial slots 146 that extend rearwardly from the front end 140 of the rear housing piece 46. The rear housing piece 46 also defines side windows 148 that provide a reduction in material for increasing the flexibility of the clamping arms 142.

Figure 9:
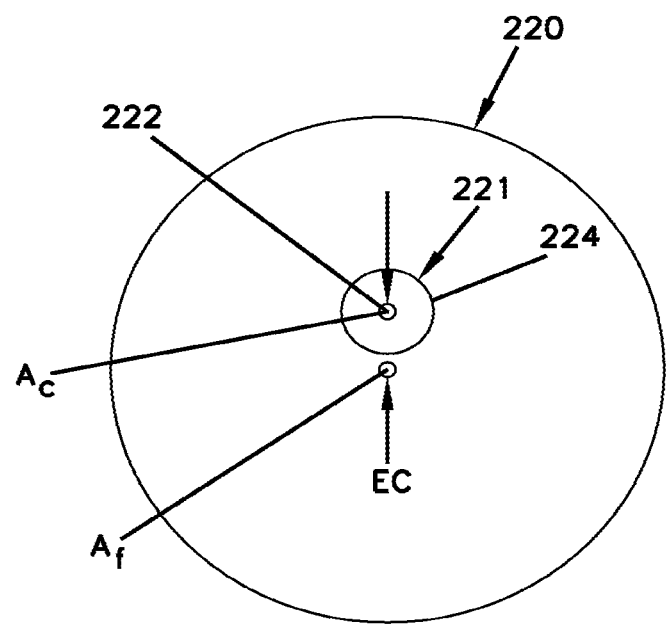
FIG. 9 is an end view of an example ferrule showing an example fiber core offset in exaggerated form.

FIG. 9 shows an end view of a ferrule 220 holding an optical fiber 221 having a fiber core 222 and a cladding 224. The cladding 224 typically has a different index of refraction as compared to the fiber core 222 so that light transmitted through the optical fiber 221 can be contained generally within the fiber core 222 by total internal reflection. The fiber core 222 is not centered relative to an outer cylindrical surface of the ferrule 220. Rather, a fiber core axis $A_C$ of the fiber core 222 is offset from a central longitudinal axis $A_F$ of the ferrule 220. In the example shown, the fiber core axis $A_C$ is offset upwardly relative to the outer cylindrical surface of the ferrule 220. In other examples, the fiber core axis $A_C$ can be offset in any other direction relative to the outer cylindrical surface of the ferrule 220. The distance EC by which the fiber core axis $A_C$ is offset from the central longitudinal axis $A_F$ of the ferrule 220 corresponds to the fiber core eccentricity and is exaggerated for the purpose of illustration. Other fiber core eccentricities can occur due to the fiber being offset within the opening of the ferrule, even if it is centrally located in the ferrule, and/or if the core is not concentric with the cladding of the fiber. The term "core offset" refers to a direction in which the core is offset from being perfectly concentric with the ferrule. The "core offset direction" and the "direction of core eccentricity" have the same meaning.

Due to fiber core eccentricity, signal losses within a system can occur at the connection between two optical fibers. This is because fiber core eccentricity prevents the fiber cores of the optical fibers being optically coupled together from being perfectly co-axially aligned. The worst-case scenario occurs when the ferrules of two fiber optic connectors being coupled together have directions of core eccentricity that are 180 degrees out of phase with respect to each other. To minimize the negative effect of fiber core eccentricity with respect to signal loss, it is desirable to position the directions of core eccentricity of the ferrules of fiber optic connectors being coupled together in the same rotational orientation. This can be accomplished by "tuning" fiber optic connectors during manufacturing such that the direction of core eccentricity is the same for all of the fiber optic connectors. Tuning typically involves rotating the ferrule to intentionally position the direction of core eccentricity of the ferrule at a particular rotational orientation relative to one or more keyed components of the fiber optic connector. Example tuning techniques are disclosed at PCT Publication No. WO 02/052310 and at U.S. Pat. No. 5,212,752, which are hereby incorporated by reference.

In certain examples, the front housing piece 44 can define an internal transverse cross-sectional shape that mates with an outer transverse cross-sectional shape of the ferrule hub 54 to prevent relative rotation between the ferrule assembly 50 and the front housing piece 44 when the internal and outer transverse cross-sectional shapes are mated. This type of configuration is advantageous for allowing and/or ensuring that the ferrule is oriented at a particular rotational orientation about the central longitudinal axis 92 within the front housing piece 44. In this way, a core offset of the ferrule can be oriented in a particular rotational orientation within the front housing piece 44 or an angle polished of the end face of the ferrule can be oriented at a particular rotational orientation within the front housing piece 44. Orienting the core offset in a particular orientation assists in providing tuning. Orienting the angled end face of angled polished ferrule at a particular rotational orientation ensures that mated angled polished ferrules have end faces that oppose and are substantially parallel to one another when their corresponding connectors are mated together.

With regard to tuning, the core offset direction of a ferrule can be marked on the ferrule hub 54 or elsewhere on the ferrule 52. In this way, when the ferrule assembly 50 is loaded into the front housing piece 44, a rotational position of the ferrule assembly can be selected such that the core offset is oriented at a predetermined rotational position. In certain examples, the mechanical interface between the ferrule assembly 50 and the interior of the front housing piece 44 can allow two, three, four, five or six different rotational orientations to be selected. In other examples, the core offset of the ferrule may be set at a predetermined rotational position relative to the ferrule hub, and the ferrule hub can be rotationally keyed relative to the interior of the front housing piece 44 such that the ferrule hub can only be inserted into the ferrule housing piece 44 at one rotational position. In this way, because there is predetermined relationship between the core offset and the orientation of the ferrule hub on the ferrule, the core offset is guaranteed to be positioned at a predetermined rotational position about the central longitudinal axis 92 within the front housing piece 44.

In the depicted embodiment, the interior of the front housing piece 44 includes one or more teeth 149 that are received within the peripheral notches 132 of the outer flange 130 to rotationally lock the ferrule assembly 50 in a desired rotational position. In the depicted example, six of the notches 132 are provided so the ferrule assembly 50 can be mounted in one of six possible rotational positions. During assembly, the ferrule assembly 50 is rotated to the rotational position where the core offset is oriented at the predetermined rotational position and then the ferrule assembly 50 is slid axially into the front housing piece 44. As the ferrule assembly 50 is slid forwardly into the front housing piece 44, the teeth 149 within the front housing piece 44 mate with the notches 132 in the outer flange 130 of the ferrule hub 54 to rotationally retain the ferrule assembly 50 in the preselected rotational position.

Figure 7:
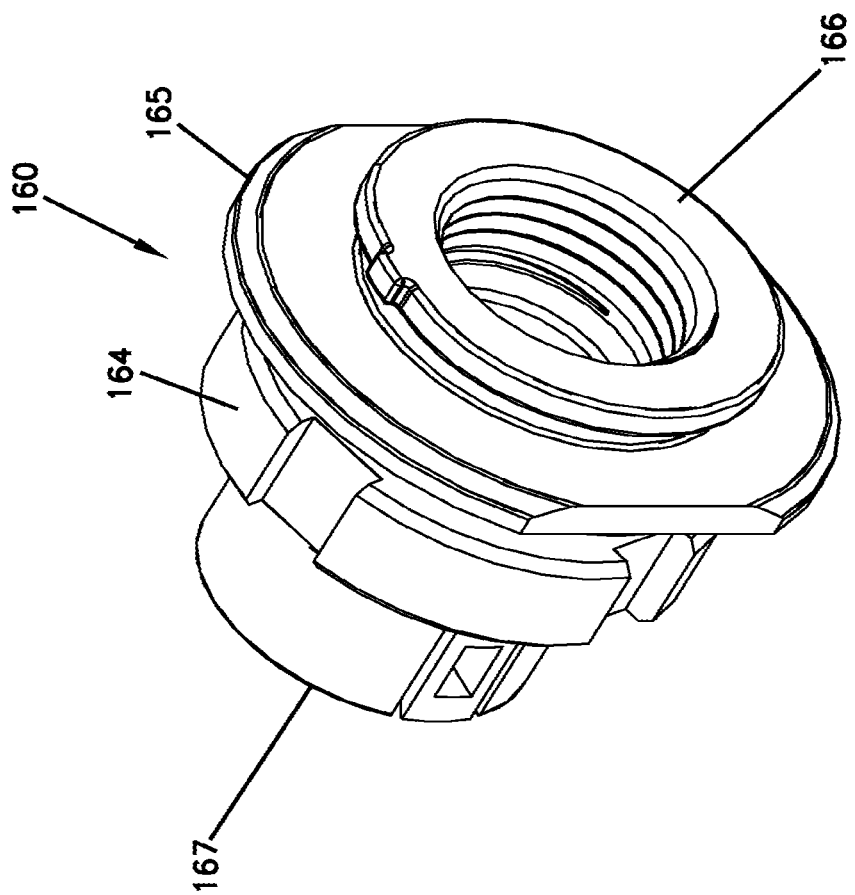
FIG. 7 depicts a connector port defining structure configured to be mounted within an opening of an enclosure, the connector port defining structure has an inner end adapted to receive and mechanically interconnect with the subassembly of FIG. 3.
Figure 8:
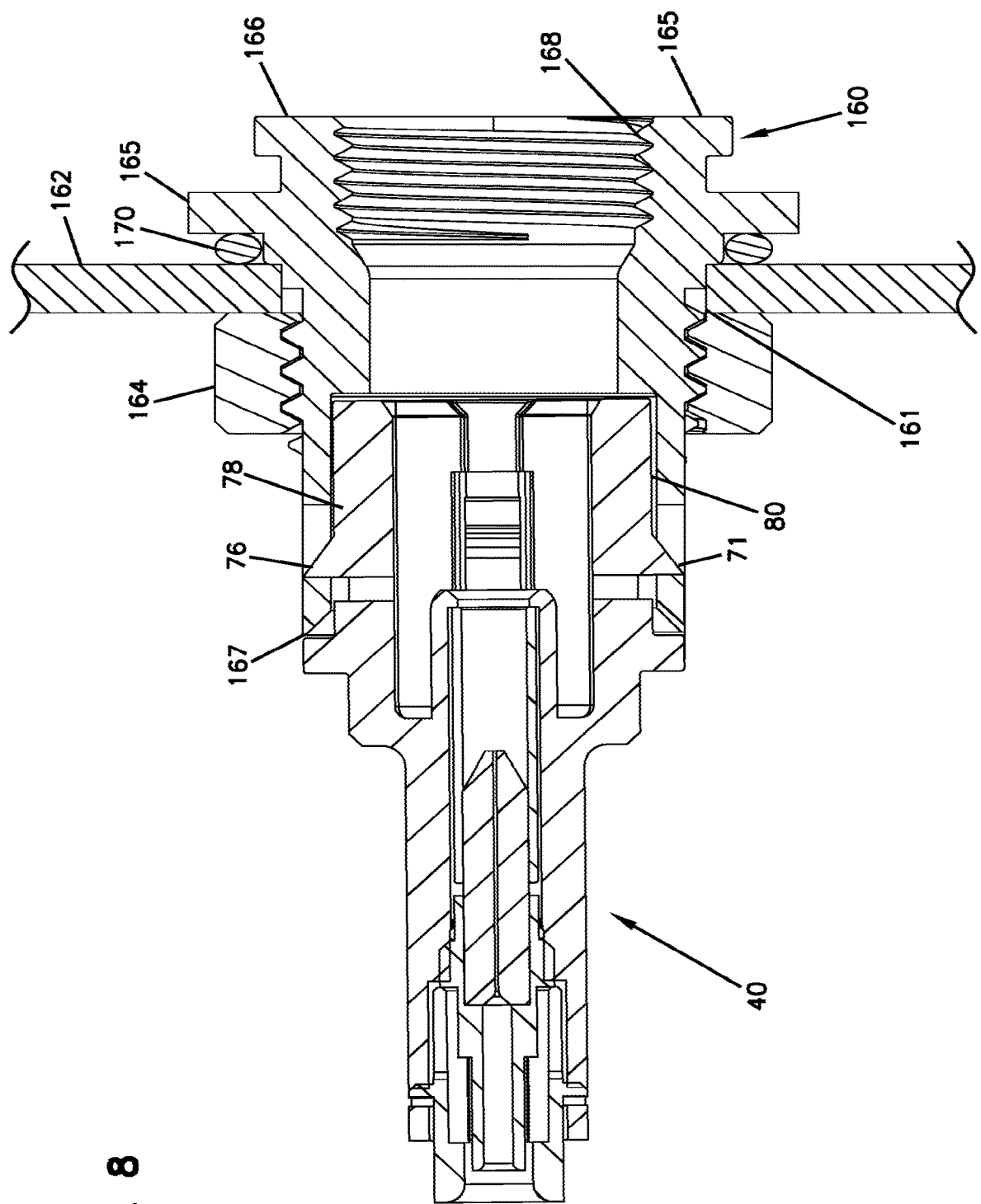
FIG. 8 is a cross-sectional view of the subassembly of FIG. 3 mounted within the inner end of the connector port defining structure of FIG. 7.

It will be appreciated that the sleeve 26 can be referred to as a "connector port defining structure" since it functions to define the connector port 28. In the embodiment of FIGS. 1-3, the sleeve 26 is shown unitarily integrated with the enclosure wall. In other examples, the subassembly 40 may be used with other types of connector port defining structures that may not be integrated with a particular "enclosure wall." For example, FIG. 8 shows the subassembly 40 mated with a connector port defining structure 160 (see FIG. 7) mounted within an opening 161 defined within a wall 162 of an enclosure 163. The connector port defining structure 160 is retained within the opening 161 by a fastener 164 such as a nut having internal threads that thread on corresponding external threads defined at the exterior of the connector port defining structure 160. The connector port defining structure 160 also includes an exterior flange 165 that opposes an outer surface of the wall 162. An environmental seal 170 is shown compressed between the wall 162 and the flange 165. The connector port defining structure 160 includes an outer end 166 and an inner end 167. The front portion 80 of the front housing piece 44 of the subassembly 40 is secured to the inner end 167 by a fastening interface such as a snap-fit connection of the type previously described herein. The outer end 166 of the connector port defining structure 160 includes a connector fastening structure 168 such as internal threads configured to mate with the fastening structure 34 of the hardened connector 36. The interconnection between the connector fastening structure 168 and the fastening structure 34 of the hardened connector 36 securely retain the hardened connector 36 within the connector port defining structure 160.

In one example, the fastening interface between the hardened connector 36 and the connector port defining structures 26, 160 can withstand a pullout force of at least 25 pounds or at least 50 pounds.

From the forgoing detailed description, it will be evident that modifications and variations can be made without departing from the spirit and scope of the disclosure.

PARTS LIST 20 telecommunications device
22 enclosure
24 enclosure wall
26 sleeve
28 connector port
30 connector fastening structure
32 outer end
34 fastening structure
36 hardened connector
38 inner end
40 subassembly
42 housing
44 front housing piece
46 rear housing piece 48 ferrule alignment sleeve
50 ferrule assembly
52 ferrule
54 ferrule hub
55 front end portion
56 rear end
58 optical fiber
60 end wall
62 dome
64 environmental seal
66 input cable
70 outer sleeve portion
72 interior sleeve portion
74 retention openings
76 retention tabs
78 flexible cantilevers
80 front portion
82 ramp surfaces
86 annular flange
88 shoulder
90 inner end
92 central longitudinal axis
94 axial channel
96 axial rail
98 flexible latching arm
100 latching tab
101 retaining projection
102 receptacle
104 axial channel
106 rear portion
108 axial slots
110 elastic arms
112 retention slots
114 retention tabs
116 sleeve receptacle
118 front stop
120 stop shoulder
130 outer hub flange
132 peripheral notches
134 front side
136 rear side
138 stop feature
140 front end
142 clamping arms
144 retention tabs
144 rear portion
148 side windows
149 teeth
160 connector port defining structure
161 opening
162 wall
163 enclosure
164 fastener
165 exterior flange
166 outer end
167 inner end
168 connector fastening structure
170 environmental seal
220 ferrule
221 optical fiber
222 fiber core
224 cladding

What is claimed is:

1. A telecommunications device, comprising:
an environmentally sealed terminal housing suitable for outside environmental use, the terminal housing having a length, a width and a height, the terminal housing having opposite minor sides that extend along the length and the height of the terminal housing, and the terminal housing defining opposite ends that extend along the width and the height of the terminal housing;
the terminal housing having a unitary one-piece molded plastic structure defining at least a portion of one of the ends of the terminal housing, the unitary one-piece molded plastic structure including:
an interior surface facing a first direction and that defines, in part, an interior of the terminal housing;
an exterior surface facing a second direction opposite the first direction and that defines, in part, an exterior of the terminal housing;
a plurality of sleeves, each of the plurality of sleeves including:
an exterior sleeve portion extending along an axis from the exterior surface and in the second direction; and
an interior sleeve portion extending along the axis from the interior surface and in the first direction,
the exterior sleeve and the interior sleeve defining a connector port extending along the axis, the connector port being configured for receiving a hardened fiber optic connector from the exterior of the terminal housing;
ferrule alignment sleeves positioned within the interior of the terminal housing, each of the ferrule alignment sleeves being in alignment with the connector port of one of the plurality of sleeves, each of the ferrule alignment sleeves including a first end and a second end, the first end facing toward the exterior of the terminal housing and the second end facing toward the interior of the terminal housing, the first end of each of the ferrule alignment sleeves being adapted to receive a ferrule corresponding to the hardened fiber optic connector when the hardened fiber optic connector is received in the connector port from the exterior of the terminal housing; and
second ferrules supporting optical fibers, each of the second ferrules being positioned within the second end of one of the ferrule alignment sleeves.

2. The telecommunication device of claim 1, wherein when the hardened fiber optic connector is received in the connector port defined by one of the plurality of sleeves from the exterior of the terminal housing, the hardened fiber optic connector contacts the unitary one-piece molded plastic structure.

3. The telecommunications device of claim 1, wherein each of the plurality of sleeves includes a fastening structure configured to mate with a corresponding fastening structure of the hardened fiber optic connector to secure the hardened fiber optic connector within the connector port.

4. The telecommunications device of claim 3, wherein the fastening structure of each of the plurality of sleeves is positioned on the exterior sleeve portion.

5. The telecommunications device of claim 4, wherein the fastening structure of each of the plurality of sleeves includes a thread.

6. The telecommunications device of claim 4, wherein the fastening structure of each of the plurality of sleeves includes a bayonet slot or a bayonet groove.

7. The telecommunications device of claim 4, wherein the fastening structure of each of the plurality of sleeves includes a bayonet post.

8. The telecommunications device of claim 3, wherein the fastening structure of each of the plurality of sleeves includes one of a thread, a bayonet slot, a bayonet groove, or a bayonet post.

9. The telecommunications device of claim 1, further comprising housing pieces, each of the housing pieces being coupled to the interior sleeve portion of one of the plurality of sleeves and supporting one of the ferrule alignment sleeves.

10. The telecommunications device of claim 9, wherein the housing pieces are coupled to the plurality of sleeves with snap-fit arrangements.

11. The telecommunications device of claim 9, wherein each of the housing pieces is inserted into the interior sleeve portion of one of the plurality of sleeves.

12. The telecommunications device of claim 1, wherein the optical fibers supported by the second ferrules are routed within the interior of the terminal housing and through the unitary one-piece molded plastic structure to an input fiber optic cable secured to the one-piece molded plastic structure.

13. The telecommunications device of claim 1, wherein the plurality of sleeves is arranged in a row of the plurality of sleeves.

14. The telecommunications device of claim 13, wherein the terminal housing includes a dome that couples to the unitary one-piece molded plastic structure to form the interior of the terminal housing such that the interior of the terminal housing is environmentally sealed.

15. The telecommunication device of claim 1, further comprising latches configured such that when hardened fiber optic connectors are inserted in the connector ports of the sleeves the latches move from latching position to accommodate the hardened fiber optic connectors and then snap back to the latching positions to latch the hardened fiber optic connectors within the connector ports once the hardened fiber optic connectors have been fully inserted in the connector ports.

* * * * *